(No Model.)

S. WILCOX.
PRESSURE GAGE.

No. 323,992. Patented Aug. 11, 1885.

WITNESSES
H. A. Johnstone.
M. F. Boyle.

INVENTOR
Stephen Wilcox,
by his attorney
Thomas D. Stetson.

UNITED STATES PATENT OFFICE.

STEPHEN WILCOX, OF BROOKLYN, NEW YORK.

PRESSURE-GAGE.

SPECIFICATION forming part of Letters Patent No. 323,992, dated August 11, 1885.

Application filed October 25, 1883. Renewed December 1, 1884. (No model.)

*To all whom it may concern:*

Be it known that I, STEPHEN WILCOX, of Brooklyn, Kings county, in the State of New York, doing business in New York city, have invented certain new and useful Improvements in Pressure-Gages, of which the following is a specification.

The object of the invention is to show the highest and lowest pressures when the pressure is variable. I intend it more particularly for situations where the pressure alternates rapidly, as in the cylinders of steam or air engines, pumps, and analogous apparatus.

I will first describe the invention as arranged to indicate the greatest pressure, and then show how by an analogous construction the gage may indicate the lowest pressure.

The accompanying drawings form a part of this specification.

Figure 1:
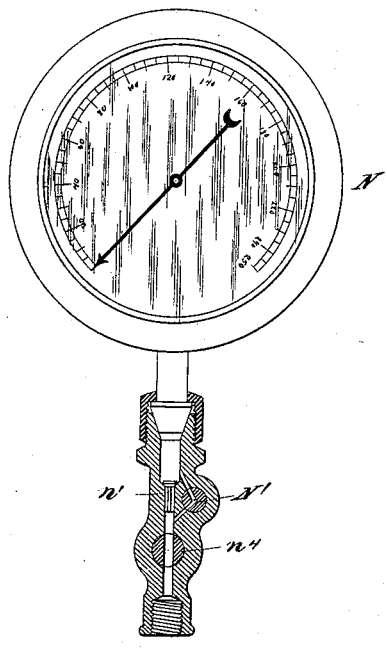
Figure 2:
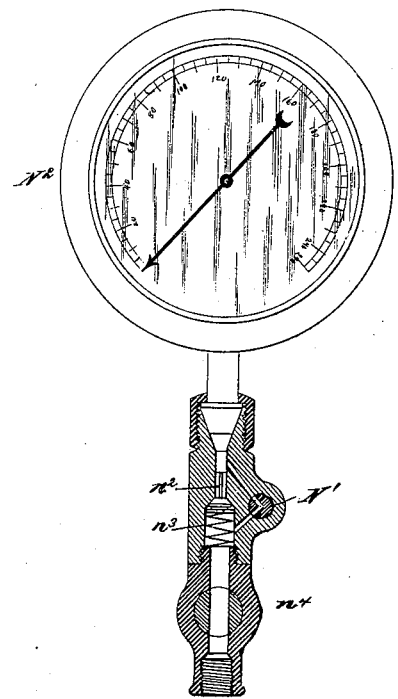

Figure 1 is an elevation, partly in vertical section, showing what I consider the best means of carrying out the invention as applied for indicating the greatest pressure. Fig. 2 is a corresponding view showing the provision for indicating the lowest pressure.

Similar letters of reference indicate corresponding parts in both the figures.

Referring to Fig. 1, N is a pressure-gage of any ordinary or suitable construction. Its interior is subject to the influence of the varying pressure in the lower end of the cylinder of a hot-air engine. (Not represented.) This pressure varies widely between its greatest and its least during any given revolution of the engine. It also varies considerably in its absolute pressure at the period of greatest pressure. When the working-piston is being driven upward in its cylinder, my gage indicates the pressure at the highest. It is provided with a self-acting valve, $n'$, opening freely upward to allow the air or any oil or other fluid acted on by the air to pass upward freely. When, during another portion of the revolution of the engine-shaft, the pressure in the working-cylinder is greatly reduced, this pressure-gage does not show the corresponding diminution of pressure. The pressure does not diminish in the gage except by a very small amount, that due to a slow movement of the air or other fluid past a stop-cock, $N'$, which communicates through small passages with the gage and with the source of pressure.

At every revolution of the main shaft there is a period at which the high pressure is felt by the gage, the same being transmitted freely past the stop-cock $N'$. The gage runs down a little, but only a little in the intervals. It vibrates between indicating the highest pressure which obtains in the cylinder and a pressure only a pound per square inch, or thereabout, below such highest pressure.

$N^2$, Fig. 2, is a pressure-gage working under opposite conditions. The valve $n^2$ is arranged to allow the oil to escape freely from the pressure-gage $N^2$ at each lowering of the pressure and to rise only slightly during the period of high pressure.

In each form of the invention the stop-cock $N'$, which is preferably small and controlling a small aperture, may, by being turned a little in one direction or the other, enlarge or contract the passage, which is always open.

Referring to Fig. 1, in case the pressure in the gage is found to run down too far during the period while the maximum pressure is off, the cock $N'$ should be turned a little to further contract the passage. In case the pressure should stay up, indicating that the passage is practically stopped, or too nearly so to keep the gage sufficiently lively, the cock $N'$ should be turned a little to enlarge the passage.

It will be understood that the stop-cock $N'$ controls the gradual flow or escape of the fluid in the direction in which it is restrained, while the self-acting valve $n'$ or $n^2$ presents a large passage, which opens freely at each change of pressure in one direction to allow the pressure in the gage to attain the highest pressure in the cylinder or the lowest, according as the construction is arranged.

Fig. 1 shows the arrangement for indicating maximum pressure, and Fig. 2 shows the arrangement for indicating the minimum pressure.

A gentle spring, $n^3$, holds the valve $n^2$ up to its seat. A cock, $n^4$, allows the gage to be thrown out of use, as usual, when required.

Modifications may be made in the forms and proportions. The two forms of the gage may be combined together on a single stand.

The importance of this invention will be readily appreciated. In hot-air engines, by reason of the pressure gages N and $N^2$, adapted the one to indicate the greatest and the other the lowest pressure, with their dials in juxtaposition, I am able to determine the conditions under which the cylinders are working with regard to pressures with great accuracy and facility.

I claim as my invention—

1. A pressure-gage, N, in combination with a self-acting valve, $n'$, and with a contracted aperture adapted to allow the movement of a fluid freely and rapidly in one direction and only very slowly in the opposite direction, as herein specified.

2. The adjustable cock or valve $N'$, in combination with the freely-opening valve $n'$, and with suitably connected passages to a pressure-gage, N, adapted to allow the pressure in the gage to change freely in one direction and under variably retarded conditions in the other direction, as herein specified.

In testimony whereof I have hereunto set my hand, at New York city, N. Y., this 7th day of September, 1883, in the presence of two subscribing witnesses.

STEPHEN WILCOX.

Witnesses:
CHARLES R. SEARLE,
WM. C. DEY.